United States Patent Office 3,494,826
Patented Feb. 10, 1970

3,494,826
POLYMER BONDED CELLULOSE AND ITS PREPARATION
David H. Scheiber, Wilmington, Del., assignor to E. I. du Pont de Nemours and Company, Wilmington, Del., a corporation of Delaware
No Drawing. Continuation-in-part of application Ser. No. 542,212, Apr. 13, 1966. This application Mar. 27, 1968, Ser. No. 716,350
Int. Cl. D21h 3/40
U.S. Cl. 162—168                    17 Claims

ABSTRACT OF THE DISCLOSURE

A polymer-bonded swollen wood pulp fiber structure is provided which has good wet and dry strength properties at small polymer loading. The polymer is substantially in the interstitial voids between the fibers of the structure in an isotropic microcellular configuration. Such a structure is prepared either from pre-swollen fibers or from fibers which become swollen during preparation by the particular solvent being used. In either case, the swollen wood pulp fibers are impregnated with a polymer solution and then the polymer is coagulated. To maintain the fibers swollen and, so they do not collapse during drying, it is necessary that the solvents present during drying are inert to the fibers. This can be accomplished in a number of ways depending upon solvent selection, e.g., inert solvents can be used throughout when pre-swollen fibers are used or fiber-swelling solvents can be used, in which case a solvent exchange with an inert solvent must be employed prior to drying. If a particular inert solvent is hydroscopic, drying must be in an inert atmosphere to prevent water from contacting the swollen fibers.

CROSS REFERENCES TO RELATED APPLICATIONS

This application is a continuation-in-part of U.S. Ser. No. 542,212, filed Apr. 13, 1966, now abandoned, which is a continuation-in-part of U.S. Ser. No. 342,231, filed Feb. 3, 1964, now abandoned.

BACKGROUND OF INVENTION

Field of invention

The invention relates to structures comprising bonding cellulose fibers, and more particularly, to microcellular sheet materials comprising wood pulp fibers bonded together with polymer, and to processes for the preparation of such materials.

Prior art

Cellulosic sheet materials, such as ordinary paper, prepared from wood pulp, or the like, possess certain properties, including opacity, porosity, tensile strength, tear strength, etc, to render them suitable for many purposes. However, the degree to which these properties occur in paper is quite variable and often undesirably low. It is often particularly difficult to combine high levels of performance for several different properties; for example, high tensile strength with high tear strength, or high opacity with high burst strength, or high porosity with high toughness, density and strength. "Toughness" is a familiar complex physical measurement of the energy absorption characteristics of the material. This property, often termed "work-to-break," may be roughly defined as the product of the stress times the strain of a sheet. In addition, paper has quite poor wet properties. That is, when these materials are wet with water, tensile strength and burst strength and like properties are virtually destroyed. Thus, while paper has been found well suited for many purposes, there are areas where the above limitations make it unsatisfactory.

The literature of papermaking and related arts reports many attempts to prepare cellulosic sheet materials having certain improved properties. For example, pigments such as clay and titanium dioxide are used to improve opacity, natural gums and resins are added in small amounts to promote bonding and provide higher porosity at equal tensile and burst strength, or synthetic resins such as the well-known urea-formaldehyde or melamine-formaldehyde resins are incorporated into the structure to provide wet strength, or the sheet is mechanically worked so as to render it more stretchable and therefore able to absorb more energy before breaking, or synthetic fibers may be added to increase the tear strength of the sheet. These and other techniques and the results obtained therefrom are well known to those skilled in the art.

While these prior art techniques have indeed considerably enhanced the utility of paper materials, they too have limitations. For example, pigments cause a decrease in tensile and burst strength and are not easily retained within the sheet during manufacture. Additives which in very small amounts improve the bonding between fibers in paper tend to make it less resistant to tearing and provide little if any protection to aqueous environments. Wet strength resins in commercial use are only partly effective in maintaining strength in the presence of water even when gross amounts are used. Synthetic fibers used to improve tear strength are of high cost, have to be used in appreciable quantity, and decrease interfiber bonding and lower opacity. In general, the use of additives results in improvement in one or two specific properties often combined with a deterioration in others.

Recognizing these facts, practitioners of the papermaking art have, in recent years, taken advantage of the large variety of properties obtainable with synthetic polymers and have incorporated them into cellulose fiber structures to obtain materials with good barrier properties, wet strength, durability as well as tear and chemical resistance. It has been taught in prior art references that for such fiber/polymer combinations to reflect the properties of the polymer, the normal interfiber hydrogen bonding in the starting material should be at a minimum. Dominance of polymer properties, however, seriously detracts from the excellent properties commonly associated with the individual cellulose fibers. On the other hand, it is well known that if prior art techniques are utilized to combine these cellulose fibers with polymers so that typical paper properties predominate, then only marginal improvements are obtained.

It is further characteristic of prior art combinations of polymers and cellulose wood pulp fibers that in order to provide the best simultaneous improvements possible in such properties as tear resistance, wet properties and toughness, incorporation of very large amounts of polymer (i.e., about 30% or more) into the sheet has been required. This leads to a material which is more like a polymer film than a porous, absorbent structure. Heretofore, it has not been possible to combine cellulose wood pulp fibers and synthetic polymers in such a way that relatively small quantities of the latter afforded high tensile strength combined with high tear resistance, porosity, toughness, opacity, excellent retention of these properties in the presence of moisture and a choice of either exceptional water absorbency or impermeability.

An object of this invention is to provide an improved structure comprising wood pulp fibers. Another object is to provide an improved microcellular sheet material comprising wood pulp fibers bonded together with polymer. A further object is to provide a microcellular sheet material comprising wood pulp fibers bonded together with polymer having high tensile strength combined with high tear resistance, porosity, toughness, opacity, and substantial retention of these properties in the presence of water, and a choice of either high water absorbency or impermeability. An additional object is to provide a process for the preparation of such improved material.

SUMMARY OF INVENTION

In accordance with the present invention, these and other objects are achieved by a process of producing a dried polymer-bonded cellulose structure which comprises (1) impregnating a web of substantially non-hydrogen bonded wood pulp fibers swollen at least 50 volume percent of their natural unswollen volume with 0.1 to 30 percent, based on the weight of said fibers, of polymer, having a tensile modulus of $10^6$ to $10^{11}$ dynes/cm.$^2$, dissolved in a solvent which is inert to said fibers, (2) bathing the impregnated web with a fluid coagulating agent, said agent being miscible with said solvent and inert to said fibers, to coagulate and substantially deposit said polymer continuously and uniformly throughout the interstitial voids between the fibers of said web in an isotropic microcellular configuration binding said fibers together, and (3) drying said web to remove said inert solvent and agent while maintaining the fibers substantially in their swollen form. The objects are also accomplished by a process of producing a dried polymer-bonded cellulose structure which comprises: (1) impregnating a web of substantially non-hydrogen bonded wood pulp fibers swollen at least 50 volume percent of their natural unswollen volume with 0.1 to 30 percent, based on the weight of said fibers, of polymer, having a tensile modulus of $10^6$ to $10^{11}$ dynes/cm.$^2$, dissolved in a solvent which is a swelling agent for said fibers, (2) bathing the impregnated web with a fluid coagulating agent, said agent being miscible with said solvent and a swelling agent for said fibers, to coagulate and substantially deposit said polymer continuously and uniformly throughout the interstitial voids between the fibers of said web in an isotropic microcellular configuration binding said fibers together, (3) removing said fiber swelling solvent and agent from said web by solvent exchange with a solvent which is inert to said fibers and (4) drying said web to remove said inert solvent while maintaining the fibers substantially in their swollen form.

By this process there is obtained a unique product which possesses truly remarkable properties. This new product comprises a web of swollen wood pulp fibers bonded together with a polymer, said fibers being swollen at least 50 percent of their natural unswollen volume, said polymer having a tensile modulus of $10^6$ to $10^{11}$ dynes/cm.$^2$, the amount of said polymer being from 0.1 to 30 percent of the weight of said fibers, said polymer substantially distributed continuously and uniformly through the interstitial voids between the fibers of said structure in an isotropic microcellular configuration.

DETAILED DESCRIPTION OF THE INVENTION

It is critical to this invention that the wood pulp fibers be swollen to at least 50 volume percent based on the original or unswollen natural volume of the fibers. Wood pulp fibers are swollen by the absorption and adsorption of a liquid in and on the fibers. The exact physical nature of such swollen fibers is not known. However, it is characteristic of the liquids that swell wood pulp fibers that they disrupt the normal hydrogen bonding prevalent in and between wood pulp fibers by solvation of the hydroxyl groups on the cellulose structure thereof. Extraneous molecules penetrate between some of the interacting hydroxyl groups, destroying both inter- and intra-fiber hydrogen bonding. This disruption of hydrogen bonding is evidenced by a loss of tensile strength of a web of wood pulp fibers adhered together primarily by hydrogen bonds.

Wood pulp fibers are swollen by a number of different liquids. As used herein, liquids which cause no swelling or only an insignificant amount of swelling (on the order of about 10 volume percent, or less), are termed "inert" toward cellulose fibers. Most liquid hydrocarbons, for example, either cause no swelling or have an insignificant swelling effect on cellulose fibers. More polar organic liquids have a greater swelling effect since they can successfully compete with the hydrogen bonds for the solvatable hydroxyl groups. Examples of such polar organic liquids include dimethylacetamide, dimethylformamide, dimethylsulfoxide, formamide, ethylene glycol, methyl alcohol, furfuryl alcohol, and the like. Water is probably the most commonly used swelling liquid. Aqueous caustic solutions, that is, aqueous solutions of the hydroxides of sodium, potassium, lithium, etc. are also commonly used in commercial practice to swell cellulose fibers. By saturating cellulose fibers with such liquids, the fibers are inherently swollen to at least 50 volume percent and usually to within the range of 50 to 1000 volume percent. Still other liquids effect what amounts to infinite swelling, that is, they completely dissolve cellulose fibers. Such liquids, of course, are not suitable for use in preparing swollen cellulose fibers for the present invention. Wood pulp fibers are not soluble in most organic or simple dilute aqueous solutions. However, certain liquids and particular combinations of materials do result in solution. Examples of these liquids include concentrated (at least 70%) sulfuric acid, concentrated phosphoric acid, cupriethylenediamine, and several basic aqueous metal ion complexes such as the iron-tartrate complex described by Jayme and Bergmann, Das Papier 11, (1957), pp. 280–287. With reference to the necessary degree of swelling of the wood pulp fibers, an inherent upper limit is imposed by the term "fibers." That is, the fibers must be swollen at least 50 volume percent, and may be swollen up to the point at which the pulp loses its fibrous nature.

The amount of swelling can be measured directly by microscopy or dilatometry or indirectly by such techniques as water retention or dye migration, such as described by Page, Tydeman and Emery, British Paper and Board Industry Research Association Bulletin, June, 1963, and Kress and Bialkowsky, Paper Trade Journal, vol. 93, p. 35 (1931).

At some stage of the process of the present invention, after the fibers have been swollen by absorption of the saturating, swelling liquid, it is necessary to remove this liquid from the fibers without destroying the swollen nature of the fibers. When a swelling liquid is removed from swollen cellulose fibers by drying (i.e., evaporation), the swollen fiber structure collapses to nearly an unswollen state. However, it is a characteristic of cellulose fibers that when a swelling liquid in the fibers is displaced or removed by another liquid which is inert or substantially more nearly inert toward cellulose fibers, and thereafter the latter removed by drying, the swollen structure is essentially preserved.

This characteristic is the basis for the well-known solvent exchange technique for obtaining swollen cellulose fibers which is commonly practiced in the art. Thus, cellulose fibers are first saturated with a swelling liquid, for example by preparing a wood pulp slurry with water. Excess water is removed by wet pressing or similar techniques. The fibers are then saturated with a liquid or vapor of lesser swelling power, such as methanol, or preferably a liquid which is inert toward the fibers, and which is miscible with the swelling liquid (water) such as acetone, methyl ethyl ketone, tetrahydrofuran, dioxane, and the like. If such liquid or vapor is then removed without introducing additional water moisture into the fibers, the swollen structure of the fibers will remain essentially intact. However, many of these liquids such as acetone and tetrahydrofuran have such an affinity toward water that if they are removed by evaporation in the atmosphere, enough moisture will be absorbed to disrupt the swollen structure. Therefore, it is necessary to either use a liquid of lesser water affinity, in which case it is necessary to use relatively large amounts thereof, or to remove the liquid by evaporation in an inert, (i.e., water-free), atmosphere, or preferably, to remove it by extraction with another liquid which is inert toward the fibers and is miscible with the previously used saturating liquid (i.e., acetone, etc.), but which has a considerably less affinity for water, such as benzene, xylene, and the like. This second liquid may then be removed by evaporation in the ordinary atmosphere without destroying the swollen structure of the fibers.

In the preparation of structures or sheet material in accordance with this invention, not only must the cellulose fibers be swollen and impregnated but thereafter the impregnated fibers must be preserved in a swollen condition so as to obtain ultimate product material which contains swollen fibers. Accordingly, water or other swelling liquid present in the impregnated web of swollen fibers must be removed by solvent exchange or equivalent technique to avoid collapsing the swollen structure of the fibers. Swollen fibers have been prepared and impregnated with polymer in a number of prior art procedures. However, in these prior art procedures, water or other swelling liquid was dried from the impregnated fibers, destroying the swollen structure thereof. For example, the polymer has been introduced in the form of an aqueous dispersion which was dried after impregnation, or the polymer has been introduced in the form of an organic solution, then coagulated by immersion in water and subsequently dried. The products obtained by such prior art procedures are entirely different from the sheet materials of the present invention.

As stated hereinbefore, it is essential that the cellulose fibers be swollen at least 50 volume percent, or usually from 50 to 1000 volume percent based on the original or unswollen natural volume of the fibers. If the fibers are swollen to either a greater or lesser extent, the resulting sheet material does not possess the desired improvement in wet-properties, toughness, and similar properties. It is particularly preferred that the cellulose fibers be swollen from 80 to 500 volume percent. It was quite unexpected to discover that the wet-properties, toughness, and similar properties of the resulting sheet material markedly increase as the degree of fibr swelling increases, up to a point (about 300 volume percent).

In the preparation of the sheet materials of this invention it is necessary to employ a web of fibers wherein the fibers are not only swollen but which are also substantially unbonded. That is, there must be substantially no hydrogen bonding or other adhering forces acting between the individual swollen fibers, other than whatever inherent mechanical entanglement forces may be present. Such a substantially unbonded web of swollen wood pulp fibers may be obtained in a number of ways, e.g., by collecting a slurry of wood pulp fibers saturated with water or other swelling liquid on a screen or other suitable support and then subjecting this web to the solvent exchange treatment described above to remove the water.

It should be noted that this web need not be dried prior to impregnation with polymer and subsequent process steps described hereinafter. That is, the swollen cellulose fibers may contain a liquid, such as liquid used in the solvent exchange treatment, or in fact may contain water or other swelling liquid. In a web of cellulose fibers containing such a liquid, the fibers while still containing liquid, are both swollen and substantially unbonded. Thus, if convenient, the web can be prepared from a water or other type of slurry, solvent exchanged to remove the swelling liquid, and not dried prior to subsequent processing. Alternatively, the web containing the swelling liquid can also be used directly, provided the swelling liquid is ulitmately removed from the fibers in such a manner that the swollen structure thereof is not destroyed. By proper selection of solvent for the polymer and fluid coagulating agent, described hereinafter, these latter substances can function to properly remove the swelling liquid. By another method this web may be prepared from bonded or unbonded unswollen fibers by slurrying and forming a web, or impregnating a preformed web of such fibers, using a solution of the polymer in a solvent such as dimethyl-sulfoxide, which is also a swelling liquid for the cellulose fibers, as the slurrying or impregnating liquid. In this way the unswollen fibers are transformed into a web of unbonded swollen fibers containing the polymer solution. Since the polymer is in solution at this stage, it does not act to bond the fibers. Thereafter, the polymer is coagulated and the polymer solvent which is also a swelling liquid is removed in such a way as to maintain the swollen structure of the fibers, e.g., by solvent exchange.

Obviously, the swollen wood pulp fibers must be somewhat compacted in the web to obtain a useful resulting sheet material, usually having a density of about 0.02 to 1.5 grams/cm.$^3$. Preferably this sheet material has a density of 0.08 to 1.0 gram/cm.$^3$ based on the dry weight of the swollen fibers alone.

The polymer used in this invention must have a tensile modulus of $10^6$ to $10^{11}$ dynes/cm.$^2$, as determined by the procedure described in ASTM D882–61T. Synthetic polymers and natural resins of any chemical constituency may be used provided they possess the requisite tensile modulus. Examples of these polymers include homopolymers of: acrylic esters, such as ethyl, methyl; methacrylic esters such as n-hexyl, cyclohexyl, ethylene glycol isobutyrate, methyl, ethyl, n-butyl, iso-butyl t-butyl, propyl, iso-propyl 2-hydroxyethyl n-octyl; vinyl esters such as acetate, pivalate, formate, propionate; halogenated monomers such as vinyl fluoride, vinyl chloride, vinyl bromide, vinylidene chloride, vinylidene fluoride, 2-chlorobutadiene, 2,3-dichlorobutadiene, trichloroethylene, tetrafluoroethylene, chlorotrifluoroethylene; styrene-type monomers, including styrene, α-methylstyrene and alkylated styrenes such as n-butylstyrene and n-hexylstyrene as well as halogenated styrenes such as p-chlorostyrene and 2,3-dichlorostyrene; other hydrocarbon monomers such as ethylene, propylene, butene; nitrogen containing monomers such as vinyl carbazole, N-vinylformamide, vinyl pyrrolidone, acrylonitrile, vinylidene cyanide; acidic monomers such as acrylic and methacrylic acids, styrene sulfonic, boronic and phosphonic acids; aldehydes such as formaldehyde, acetaldehyde, crotonaldehyde, acrolein; interpolymers of the above monomers with each other and with butadiene, isobutylene, isoprene, alkyl acrylates such as n - butyl, iso - butyl, t - butyl, propyl, iso-propyl, n-hexyl, n-octyl, n-stearyl, n-lauryl, 2-ethylhexyl; alkyl methacrylates such as n-decyl, stearyl, lauryl; vinyl esters such as vinyl hexoate, stearate, butyrate, and miscellaneous functional monomers such as maleates, fumarates, maleic acid, fumaric acid, itaconic acid, allyl glycidyl ether, glycidyl acrylate and methacrylate, alkyl vinyl ethers, ethylene oxide, propylene oxide, butylene oxide, cyclohexene epoxide, tetrahydrofuran, sulfur dioxide and carbon monoxide; polymers and interpolymers made by post treatment of the polymers and interpolymers made by polymerizing the said monomers, for example, halogenated polyethylene, hydrolyzed vinyl acetate, halogenated polyethers or ethylene/propylene copolymer, chlorosulfonated polyolefins, halogenated and/or hydrolyzed ethylene/vinyl acetate copolymer, hydrogenated ethylene/carbon monoxide polymers, hydrolyzed, aminated, phosphonated or otherwise modified polyepoxides; condensation polymers formed from dibasic acids and glycols, acids and amines, esters and amines, di-anhydrides and glycols, glycol carbonates and diacids, diacid chlorides and glycols or diamines, diisocyanates and glycols, dimercaptans or diamines, polyethers and diisocyanates and other similar materials. The homopolymers and copolymers may be prepared by graft or block polymerization, emulsion, solution, dispersion, vapor or bulk polymerization, initiated by anionic, cationic, free radical, organometallic or inorganic systems. Natural resins such as starch, casein, gutta percha, gum acacia, guar gum, gum arabic etc. chemically modified natural products such as hydroxyethyl, cyanoethyl, aminoethyl, carboxymethyl and other celluloses, starches, and proteins may be used provided they possess the requisite tensile modulus.

Prior art references generally teach that polymers incorporated into cellulose fiber sheet materials should be elastomeric, that is, have tensile moduli in the range of about $10^6$ to $10^8$ dynes/cm.$^2$, in order to most effectively improve the tear strength, toughness, and similar properties thereof. Therefore, it was very surprising to discover that the preferred polymers for use in the present invention have tensile moduli in the range of $10^8$ to $10^{10.5}$ dynes/cm.$^2$. Polymers having tensile moduli within this preferred range provide by far the most substantial improvement in wet properties, toughness, and similar properties of the resulting sheet material. Optimum property improvements are obtained with chloroprene polymers and acrylonitrile polymers, in particular, acrylonitrile/alkyl acrylate copolymers wherein the alkyl group contains 4 to 10 carbon atoms.

From 0.1 to 3.0% of polymer, based on the dry weight of the fibers, should be incorporated into the web. Optimum results are normally obtained by the use of 1 to 10% of polymer, based on the weight of fibers. When polymers having relatively low moduli, i.e., $10^6$ to $10^7$ dynes/cm.$^2$, are used, it is generally desired to select a relatively hydrophobic polymer and to add the polymer in a greater than normal amount, on the order to 15–30% based on the weight of fibers.

In the practice of this invention, the polymer is dissolved in a solvent. This solvent must be a nonsolvent for the fibers, that is, it must not dissolve or destroy the fibers, and usually must be sufficiently inert toward the cellulose fibers to cause less than about 1000 volume percent swelling of the fibers. Thus, the polymer may be dissolved in water or other liquid which is a swelling liquid for the fibers. In such case, the water or other swelling liquid subsequently must be removed in a manner which will not destroy the swollen structure of the wood pulp fibers. Obviously, a solvent which dissolves the cellulose fibers is not operable in this invention. If the web of fibers contains another liquid, obviously, the solvent should be miscible with that liquid.

Since only relatively small amounts of polymer are incorporated into the sheet material of this invention, from 0.1 to 30% based on the weight of the fibers, it is preferred to use rather dilute polymer solutions for ease of control over the amount of polymer actually incorporated. Also use of such dilute solutions insures that the polymer will be evenly distributed throughout the web. Thus, it is preferred to use a solution containing on the order of 1 to 10% of polymer. The web of wood pulp fibers may be impregnated with the solution of polymer in solvent by immersing the web into the solution, by spraying the solution onto the web, or by other methods familiar to those skilled in the art.

After the web of cellulose fibers is impregnated with the polymer solution, it is essential that the impregnated web be saturated or bathed with a fluid coagulating agent which is a nonsolvent for the polymer, is miscible with the solvent used for the polymer solution, and is a nonsolvent for the swollen cellulose fibers. Any liquid or vapor compound may be used as the fluid coagulating agent provided it possesses the three-fold requirements of (1) being a nonsolvent for the polymer, (2) being miscible with the solvent used for the polymer solution, and (3) being a nonsolvent for the wood pulp fibers. Preferably, the fluid coagulating agent is inert toward the swollen wood pulp fibers. If the fluid coagulating agent is also a swelling liquid for the fibers, then the coagulating agent must be subsequently removed by solvent exchange or other techniques which will not destroy the swollen nature of the fiber, nor the polymer deposition, described below. Preferably, the coagulating agents are liquid hydrocarbons of 4 to 15 carbon atoms such as pentane, hexane, hexene, octene, cyclopentane, cyclohexane, cyclohexene, decolin, tetralin, toluene, xylene, benzene and ethyl benzene and alkanols of 1 to 8 carbon atoms such as methanol, butanol and octanol.

The impregnated web of cellulose fibers may be bathed with the fluid coagulating agent by any suitable means such as by immersing the web into a liquid coagulating agent, by spraying a liquid coagulating agent onto the web, by passing the web through a cross-flow of a vaporous coagulating agent, or by other methods known in the art.

The net result of bathing the impregnated web with the fluid coagulating agent is the deposition of the polymer in a particular critical configuration. That is, the polymer is deposited in an isotropic microcellular configuration continuously and uniformly throughout the web binding the swollen cellulose fibers together.

If a web impregnated with polymer solution is dried without first coagulating the polymer, this critical polymer deposition configuration is not obtained. Instead, the polymer is deposited in what may be termed a fiber-replicating configuration throughout the web, resulting from its drying upon the surfaces of the cellulose fibers rather than filling the interfiber voids. That is, the polymer is in the form of definite strands or a fiber-like configuration. Thus, in the commonly used prior art processes where a solution or dispersion of a polymer is impregnated into a web of fibers and the solvent or dispersing medium is removed by evaporation or equivalent means, the polymer is not deposited in an isotropic configuration. That is, the polymer configuration is not essentially the same in all directions, but is in a fiber-replicating form since it is concentrated on the cellulose fiber surfaces and at points where the fibers cross over one another. The term "isotropic" is used herein to define the configuration where the polymer distribution is essentially the same in all directions in the interstitial voids between the fibers. This isotropic configuration is critical to the present invention, since the wet-properties of webs of swollen cellulose fibers having the polymer deposited in an isotropic configuration therein are remarkably superior to the same properties of webs of swollen cellulose fibers having an equivalent amount of the same type of polymer deposited in the fiber-replicating configuration therein.

By the process of this invention the polymer is also deposited in a microcellular configuration. That is, the polymer forms into a myriad of microcells or pores. It is not certain whether these are closed cells or open cells or a combination thereof.

The polymer is also deposited continuously in the web. The term "continuously" refers to the fact that there are no major disruptions or gaps in the microcellular configuration of the polymer. In some instances, there may be few "holes" or gaps which are large, relative to the majority of the other microcells. However, these "holes" themselves actually may be considered as micro in size, and they do not significantly affect the properties of the resulting sheet material.

The polymer is also deposited uniformly throughout the web of swollen cellulose fibers. The term "uniformly" means a substantially even distribution of the polymer throughout the web, there being no noticeable migration of polymer to the surfaces of the resulting sheet material or no appreciable accumulation of polymer in certain areas of the web.

The swollen cellulose fibers are bonded together with the polymer. However, the exact nature of the bonds is uncertain. Although in some instances there may be adhesive bonds formed between the polymer and the fibers, polymers which normally are not adhesive in nature also form strong bonds. It is speculated that in at least some instances there may be a mechanical entrapment of the fibers within the polymer configuration which in effect bonds the fibers together. Possibly in some instances there is a combination of adhesive bonds and mechanical entrapment bonds.

After the impregnated web is bathed with the fluid extracting agent, the solvent used in the polymer solution and fluid coagulating agent are removed by any suitable means without destroying the swollen structure of the cellulose fibers. Excess liquid may be removed by wet-pressing or similar methods. Where the fluid remaining after the coagulation is inert toward the swollen wood pulp fibers, the web may be air dried, and the swollen structure of the fibers will remain intact. It should be noted that the bulk of the solvent and fluid coagulating agent may be removed virtually simultaneously with the coagulation step, where the web of impregnated fibers is passed through a cross-flow of a vaporous extracting agent. Since the coagulating agent is miscible with the solvent, the vapor will condense and then remove considerable amounts of the solvent. Any residual liquid, that is, solvent and condensed coagulation agent, may be removed by air drying. After the solvent and extracting agent are removed, the resulting sheet material may be subjected to any desired treatment such as further pressing, embossing, coating, and the like.

Persons skilled in the papermaking and related arts are thoroughly familiar with the multiplicity of variables which may be altered by various techniques in the preparation of cellulose fiber sheet materials to product an infinite variety of different end product sheet materials. It will be recognized that many of these same techniques may be applied in the preparation of the polymer bonded swollen cellulose fiber sheet materials of the present invention. Thus, particular types of wood pulp fibers and polymers may be selected to produce specifically desired sheet materials. The wood pulp fibers may be subjected to various treatments such as heating provided they still form a web of substantially unbonded swollen fibers. Other natural or synthetic fibers may be incorporated into the web. The web may be subjected to pressing at several stages in the process. For example, pressing may be done before the web is impregnated with the polymer solution to affect the density of the web. The web may also be pressed after the impregnation step, after the web is bathed with the fluid coagulating agent, or after the solvent and fluid coagulating agent have been removed therefrom. Also, the resulting sheet material may be calendered. Calendered sheet materials prepared according to this invention have excellent printability properties. The resulting sheet materials can be coated with various substances. Embossing of the resulting sheet material produces special effects. The web containing the polymer may be subjected to heat treatment at various stages to crosslink or otherwise alter the nature of the polymer, provided the polymer remains deposited in an isotropic microcellular configuration continuously and uniformly throughout the web. Various compositions or substances can be incorporated into the web such as plasticizers, polymer curing agents, dyes, pigments, surfactants to increase the water absorptivity of the resulting sheet material, and the like. The sheet materials prepared in accordance with this invention inherently have exceptional water impermeability properties. These sheet materials can be rendered highly water absorptive by treating with any of the well-known ionic, anionic or nonionic surfactants.

The sheet materials of this invention possess truly remarkable properties. Not only are the wet and dry toughness and wet-properties such as tear-strength, tensile strength, burst strength and the like greatly improved, but the ratios of wet-to-dry toughness, tear strength, tensile strength, burst strength and the like are markedly improved. In fact in some instances the absolute values of some properties, particularly tear strength and toughness actually are higher when the sheet is wet with water than when the sheet is dry. Moreover, the properties of the dry sheet materials are improved, such as tear strength, tensile strength, burst strength, etc. Furthermore, the improvements in these properties are not offset by deleterious effects on other important properties. Therefore, the sheet materials of this invention possess a combination of high tensile strength, high tear strength, toughness, vapor porosity, opacity, and substantial retention of these properties in the presence of moisture, and either exceptional water impermeability or water absorbency as may be desired, and flexibility. A very unique property of the sheet materials of this invention is that the exceptional liquid water impermeability is present in combination with water vapor permeability. Thus, these sheet materials are especially useful where it is desired to have a liquid water barrier which will permit passage of water vapor, for example, use as raincoat or shoe lining material. Also, since the amount of polymer incorporated into the web of fibers is quite low, from 0.1 to 30% or preferably 1 to 10% based on the weight of the fibers, the polymer does not detract from the desirable properties imparted to the material by the wood pulp fibers.

This invention provides extremely durable wood pulp fiber sheet materials suitable for a vast multiplicity of uses. These materials may be used in all applications where cellulose sheet materials such as paper, paperboard and the like have been used heretofore. Because of the unique properties of the sheet materials of this invention, they are especially suitable for use where extreme durability is essential, and particularly where the material must be durable even though saturated with water. A few of such uses include window shades, storage and shipping boxes, grocery sacks and other packaging materials, tarpaulins, disposable bed sheets, surgical gowns, tissue paper, filters, laboratory and shop coats, desiccant bags, adhesive paper and tape stocks, chamois replacements, gaskets, shoe lining stock, maps, book cover stock, automobile trim panel base stock, writing paper and particularly paper for use as important documents, grease cloths, curtains, napkins, tablecloths, so-called "paper plates," disposable raincoats, disposable washcloths, drop cloths, mulch sheets, durable toys such as reduced-scale nonoperative stoves, cabinets, refrigerators, etc. projection screens, masking materials, wall covering, outdoor sign board printing paper, artists' drawing and painting book paper, and the like. In addition, the sheet materials produced by this invention may be cut into strips, and twisted to make twine, which in turn can be used to prepare fabrics, ropes, and the like. Furthermore, filamentary structures, such as fibers, cordage, and rope-like structures, may be conveniently prepared in accordance with this invention, by extruding a wet web of wood pulp fibers into the desired filamentary form either before or after impregnation with polymer, followed by subsequent polymer coagulation and other process steps as taught herein. Because the sheet materials of this invention are so durable, articles prepared therefrom may be cleaned by washing with water. Indeed, where convenient, they may be washed in an ordinary washing machine, dried and then returned to their intended service.

The invention is further explained by means of the following illustrative and comparative examples. In the examples, except as otherwise noted: Bleached kraft pulp fibers were dispersed in water (with or without beating, so indicated by the Canadian Standard Freeness values), using a Valley Laboratory Beater, Valley Iron Works Co., Appleton, Wis. The dispersions were converted into 8 inch by 8 inch waterleafs, using a Noble and Wood handsheet machine (Noble and Wood Machine Company, Hoosick Falls, N.Y.). The waterleafs were wet pressed to contain 10–30 weight percent fiber and 90–70 weight percent water complementally. The pressed waterleafs were either solvent exchanged, or direct air dried on the screens, as indicated, and then pressed to 12–13 mils thickness to form 3 grams, 8 inch by 8 inch handsheets, having a basis weight of 50 pounds/TAPPI ream (i.e., per 500 sheets, 25 inch by 40 inch size). When the solvent exchange procedure was used, the waterleafs were immersed in an acetone bath for about 5 minutes, with very gentle movement of the sheet, then immersed in a benzene bath for an additional 5 minutes, and then air dried. The solvent exchange procedure produced substantially unbonded cellulose fiber handsheets in which the volume of the fibers was 50 to 1000 percent greater than their natural unswollen volume. The dried handsheets were impregnated with polymer solution, rolled with a 22.4 pound roller having a 4 inch diameter to remove excess liquid, and then either coagulated with a fluid coagulating liquid or directly air dried, as indicated. The resulting sheets were pressed to 4 mil thickness, and thereafter conditioned at 50 percent relative humidity and 73° F. for 24 hours. The following test procedures were used:

*Canadian Standard Freeness.*—Tappi T227m–58.

*Tensile strength.*—Samples 0.5 in, or 1 in. x about 4 in. were clamped with lined or flat contact jaws so as to provide 2 inches between the points of contact, and then were tested at 1 in./minute with an Instron tensile tester. All wet tensile strength measurements (from which wet elongation and toughness values were also obtained) were made after soaking 2 hours in distilled water at 73° F.

*Toughness.*—The integrated area beneath the tensile load-elongation curve, expressed as inch-pounds/indicated area.

*Elongation.*—Directly recorded on the Instron chart during the tensile strength measurement, expressed as percent of original length.

*Tear strength.*—The Elmendorf tear test as described in Tappi T414m–49 except that the sample width was reduced to 1.5 inches, with results expressed in grams of force.

*Fold endurance.*—Tappi T423m–50 using the M.I.T. Fold Test, expressed as the number of double folds to failure.

*Burst strength.*—Tappi 403m–53.

*Opacity.*—Tappi 42, 139A (1959), a proposed revision of Tappi Official Standard T425m–44.

*Modulus.*—ASTM D882–61T.

In these examples the amount of polymer loading in the cellulose fiber webs is expressed as percent of polymer based on the weight of the dry fibers. Concentration of polymer in solution is expressed as weight percent of total solution. The data shown in these examples are the average of at least four tests and in the majority of these examples are the average of six or more tests.

EXAMPLE 1

Sheet materials were prepared from a slurry of unbeaten bleached kraft pulp having a Canadian Standard Freeness of 670 ml. In illustrative Test 1 of this example the waterleafs were solvent exchanged, and in comparative Test 2 the waterleafs were directly air dried. In both tests, the handsheets were impregnated by immersion in a 1.5% acetone solution of a copolymer, of 47 weight percent acrylonitrile and 53 weight percent n-butyl acrylate, having a tensile modulus of $5 \times 10^9$ dynes/cm.$^2$, and the polymer was coagulated by immersing the impregnated rolled sheet in petroleum ether. The sheets were then dried, pressed at 150° C., conditioned, and tested. The results were shown in Table I:

TABLE I

|  | Test 1: Waterleaf Solvent Exchanged | Test 2: Waterleaf Directly Dried |
|---|---|---|
| Polymer Loading, percent | 5.4 | 5.2 |
| Dry Tensile, lb./in | 26.0 | 15.4 |
| Wet Tensile, lb./in | 11.4 | 2.8 |
| Wet/Dry Tensile | 0.44 | 0.17 |
| Dry Toughness, in.-lb./2 in.$^2$ | 2.2 | 1.0 |
| Wet Toughness, in.-lb./2 in.$^2$ | 1.23 | 0.20 |
| Dry Elongation, percent | 6.3 | 3.9 |
| Wet Elongation, percent | 10.4 | 5.6 |
| Tear, g | 160 | 104 |
| Fold Endurance | 459 | 31 |
| Burst, p.s.i | 49 | 24 |
| Opacity, percent | 90 | 86 |

These results strikingly illustrate the properties of a sheet material of this invention by comparison with a sheet material prepared in an identical manner from constituents identical except that in Test 2 the cellulose fibers were collapsed and rebonded. As is readily apparent from Table I, all properties are remarkably improved in the sheet material of this invention.

EXAMPLE 2

Waterleafs were prepared from alpha-pulp, that is, kraft pulp which has been swollen greatly by caustic to remove virtually all hemicellulosics so that a web of fibers prepared from such pulp inherently is virtually completely unbonded regardless of how the water is removed therefrom. In illustrative Test 1 of this example, the waterleafs were dried by solvent exchange to obtain a web of unbonded swollen cellulose fibers. In comparative Test 2, the waterleafs were dried directly to obtain a web of unbonded, but unswollen, cellulose fibers. In both tests the resulting handsheets were impregnated with the acrylonitrile/n-butyl acrylate copolymer and coagulated as in Example 1. The results of this example are shown in Table II:

TABLE II

|  | Test 1: Swollen Fibers | Test 2: Unswollen Fibers |
|---|---|---|
| Polymer Loading, percent | 7.7 | 5.5 |
| Dry Tensile, lb./in | 17.5 | 9.5 |
| Wet Tensile, lb./in | 9.8 | 1.9 |
| Wet/Dry Tensile | 0.56 | 0.13 |
| Dry Toughness, in.-lb./2 in.$^2$ | 2.0 | 0.59 |
| Wet Toughness, in.-lb./2 in.$^2$ | 1.6 | 0.14 |
| Dry Elongation, percent | 7.1 | 3.8 |
| Wet Elongation, percent | 15.1 | 5.4 |

The criticality of the use of swollen cellulose fibers is obvious from these results.

EXAMPLE 3

This example illustrates the importance of bathing the impregnated web of swollen wood pulp fibers with a fluid coagulating agent. In this example, handsheets were made and impregnated with the acrylonitrile/n-butyl acrylate copolymer solution as shown in Example 1. Different polymer loadings as shown in Table III were obtained by varying the pressing applied to the impregnated web and the concentration of the polymer solution used for impregnation. The illustrative sheets were coagulated by immersion in petroleum ether and then dried, whereas the comparative sheets were dried without a coagulation treatment. The results of this example are summarized in Table III:

TABLE III

| | Basis Weight, lb./TAPPI Ream | | | | |
|---|---|---|---|---|---|
| | 112 | 81.5 | 55.3 | 40.1 | 33.4 |
| Weight Percent Loading [1]: | | | | | |
| Coagulated | 2.2 | 3.6 | 4.0 | 3.2 | 2.4 |
| Air Dried | 1.6 | 3.7 | 3.1 | 2.9 | 2.5 |
| Dry Tensile, lb./in.: | | | | | |
| Coagulated | 48.1 | 42.0 | 27.9 | 15.7 | 12.8 |
| Air Dried | 25.9 | 24.1 | 16.4 | 11.6 | 9.9 |
| Dry Tensile/Loading: | | | | | |
| Coagulated | 22.5 | 11.5 | 7.1 | 4.9 | 5.4 |
| Air Dried | 16.2 | 6.6 | 5.3 | 4.0 | 4.0 |
| Wet Tensile lb./in.: | | | | | |
| Coagulated | 23.9 | 21.6 | 14.7 | 8.0 | 7.1 |
| Air Dried | 13.0 | 9.4 | 7.5 | 4.2 | 2.9 |
| Wet Tensile/Loading: | | | | | |
| Coagulated | 11.0 | 5.9 | 3.7 | 2.5 | 3.0 |
| Air Dried | 8.1 | 2.6 | 2.4 | 1.4 | 1.2 |
| Wet Tensile/Dry Tensile: | | | | | |
| Coagulated | 0.50 | 0.52 | 0.53 | 0.51 | 0.56 |
| Air Dried | 0.50 | 0.39 | 0.46 | 0.36 | 0.29 |
| Dry Toughness in.-lb./2 in.[2]: | | | | | |
| Coagulated | 4.9 | 4.1 | 2.7 | 1.2 | 1.2 |
| Air Dried | 2.1 | 2.0 | 1.2 | 0.9 | 0.8 |
| Dry Toughness/Loading: | | | | | |
| Coagulated | 2.3 | 1.1 | 0.7 | 0.4 | 0.5 |
| Air Dried | 1.3 | 0.6 | 0.4 | 0.3 | 0.3 |
| Wet Toughness in.-lb./2 in.[2]: | | | | | |
| Coagulated | 2.9 | 2.7 | 1.7 | 0.8 | 0.6 |
| Air Dried | 1.5 | 1.1 | 0.8 | 0.4 | 0.3 |
| Wet Toughness/Loading: | | | | | |
| Coagulated | 1.4 | 0.8 | 0.4 | 0.3 | 0.2 |
| Air Dried | 0.9 | 0.3 | 0.3 | 0.1 | 0.1 |
| Dry Elongation, Percent: | | | | | |
| Coagulated | 7.4 | 7.2 | 7.5 | 5.6 | 6.5 |
| Air Dried | 5.3 | 5.6 | 5.4 | 5.7 | 5.9 |
| Wet Elongation, Percent: | | | | | |
| Coagulated | 11.7 | 11.0 | 11.3 | 9.8 | 8.5 |
| Air Dried | 9.8 | 9.1 | 10.0 | 8.5 | 7.6 |

[1] Before bonding all sheets were pressed to:
$$\left(\frac{\text{Basis Weight} \times 13}{50}\right) \text{mils.}$$

EXAMPLE 4

This example compares the effects of fluid coagulating agents which are inert and non-inert toward the swollen wood pulp fibers, when the coagulant is removed by direct air drying. In this example handsheets were prepared from a slurry of bleached sulfite paper pulp beaten to a Canadian Standard Freeness of 500 ml., and dried by the solvent exchange procedure. These handsheets were impregnated by immersion in a 2.5% benzene solution of poly(methylacrylate) having a tensile modulus of about $5 \times 10^7$ dynes/cm.[2]. In illustrative Test 1 of this example, the polymer was simultaneously coagulated and solvent exchanged by immersion of the impregnated web into petroleum ether. In comparative Test 2, the polymer was coagulated by immersion of the impregnated web into a mixture of 75 volumes of acetone and 25 volumes of water. Both products were then air dried. The results are shown in Table IV:

TABLE IV

| | Test 1: Coagulated with Petroleum Ether | Test 2: Coagulated with Acetone/ Water |
|---|---|---|
| Polymer Loading, percent | 5.6 | 6.5 |
| Dry Tensile, lb./in | 16.1 | 16.1 |
| Dry Tensile/Loading | 2.9 | 2.5 |
| Wet Tensile, lb./in | 6.8 | 2.6 |
| Wet Tensile/Loading | 1.2 | 0.4 |
| Wet/Dry Tensile | 0.42 | 0.16 |
| Dry Toughness, in.-lb./2 in.[2] | 1.3 | 1.4 |
| Dry Toughness/Loading | 0.23 | 0.22 |
| Wet Toughness, in.-lb./2 in.[2] | 0.72 | 0.24 |
| Wet Toughness/Loading | 0.13 | 0.04 |
| Dry Elongation, percent | 5.9 | 6.2 |
| Wet Elongation, percent | 6.2 | 8.2 |
| Opacity, percent | 93.3 | |

It is evident from these results, that the use of a fluid coagulating agent which is not inert toward the swollen wood pulp fibers without the subsequent removal thereof in a manner which preserves the swollen structure of the fibers, produces a sheet material which has inferior properties as compared to a sheet material prepared by a process wherein the fluid coagulating agent is inert toward the fibers.

EXAMPLE 5

This example illustrates use of a polymer solution wherein the polymer solvent is not inert toward swollen wood pulp fibers, and also use of a fluid coagulating agent which is not inert toward such fibers. In illustrative Test 1 of this example, the handsheets were immersed for 3 minutes in a 3% solution of the acrylonitrile/n-butyl acrylate copolymer of Example 1, dissolved in a 50–50 weight percent mixture of acetone and dimethyformamide, which causes swelling of wood pulp fibers. The impregnated handsheets were then rolled to remove excess solution, and then immersed in methylene chloride to coagulate the polymer and also to remove the polymer solvent without destroying the swollen structure of the fibers. The sheets were then dried, and subsequently pressed for two minutes at 150° C., to a thickness of about 4.0 mils. In illustrative Test 2, the procedure of Test 1 was followed except that the polymer was coagulated by immersion of the impregnated handsheets into water. The water was then removed by immersion into acetone, and then into petroleum ether. The handsheets were then dried and pressed as in Test 1. The results of this example are shown in Table V:

TABLE V

| | Test 1 | Test 2 |
|---|---|---|
| Polymer Loading, percent | 4.8 | 5.4 |
| Dry Tensile, lb./in | 20.5 | 20.3 |
| Wet Tensile, lb./in | 11.8 | 10.4 |
| Wet/Dry Tensile | 0.58 | 0.51 |
| Dry Toughness, in.-lb./2 in.[2] | 1.60 | 1.2 |
| Wet Toughness, in.-lb./2 in.[2] | 1.66 | 1.0 |
| Dry Elongation, percent | 5.8 | 5.9 |
| Wet Elongation, percent | 10.1 | 9.4 |

As shown in Table V, these two procedures produce sheet materials having approximately equivalent properties.

EXAMPLE 6

This example shows the use of a low-modulus polymer. In all tests of this example, a chlorinated polyethylene having a tensile modulus of $3.5 \times 10^7$ dynes/cm.[2] was used as a 3% solution in benzene and methanol was used as the coagulant liquid. The sheets were prepared from an unbeaten alpha pulp. In Tests 1 and 2, sheet materials were prepared having relatively low polymer loadings (about 6–9%) and in Tests 3 and 4 the sheet materials prepared had relatively high polymer loadings (about 17–19%). In comparative Tests 1 and 3, the handsheets were prepared from waterleafs dried directly, while in illustrative Tests 2 and 4, the handsheets were prepared from waterleafs dried by solvent exchange. The results are shown in Table VI:

quently coagulated by immersion into petroleum ether. After drying, all sheets were pressed at 175° C. for 2

TABLE VI

| | Test 1: Directly Dried | Test 2: Solvent Exchanged | Test 3: Directly Dried | Test 4: Solvent Exchanged |
|---|---|---|---|---|
| Polymer Loading, percent | 8.9 | 6.6 | 18.3 | 17.3 |
| Dry Tensile, lb./in | 5.8 | 5.3 | 6.8 | 8.1 |
| Dry Tensile/Loading | 0.65 | 0.80 | 0.37 | 0.47 |
| Wet Tensile, lb./in | 3.2 | 3.0 | 2.9 | 4.6 |
| Wet Tensile/Loading | 0.36 | 0.45 | 0.16 | 0.27 |
| Wet/Dry Tensile | 0.55 | 0.57 | 0.43 | 0.57 |
| Dry Toughness, in.-lb./2 in.$^2$ | 0.54 | 0.62 | 0.88 | 1.5 |
| Dry Toughness/Loading | 0.06 | 0.09 | 0.05 | 0.09 |
| Wet Toughness, in.-lb./2 in.$^2$ | 0.62 | 0.58 | 0.60 | 1.2 |
| Wet Toughness/Loading | 0.07 | 0.09 | 0.03 | 0.07 |
| Wet/Dry Toughness | 1.2 | 0.9 | 0.7 | 0.8 |
| Dry Elongation, percent | 5.5 | 6.8 | 7.6 | 10.6 |
| Wet Elongation, percent | 13.1 | 14.2 | 13.5 | 18.1 |

As these data demonstrate, polymers having a relatively low modulus, on the order of $10^6$ to $10^7$ dynes/cm.$^2$ provide significant improvements when used at relatively low loadings, i.e., less than about 10%. However, these improvements are considerably more marked at higher loadings, i.e., above 15%.

EXAMPLE 7

This comparative example shows the use of a polymer having a modulus of less than $10^6$ dynes/cm.$^2$. In both tests of this example, a n-butyl acrylate homopolymer having a modulus of $10^5$–$10^6$ dynes/cm.$^2$ was used as a 3% solution of benzene. In the preparation of sheet materials, the handsheets were immersed into 3% solutions of this polymer in benzene. In Test 1, the polymer solution was air dried without coagulation. In Test 2, the polymer solution was coagulated by immersion of the impregnated handsheet into methanol. After drying all sheets were pressed at room temperature for 2 minutes to 4 mils thickness. The results of this example are listed in Table VII:

TABLE VII

| | Test 1: Polymer Directly Dried | Test 2: Polymer Coagulated |
|---|---|---|
| Polymer Loading, percent | 11.6 | 6.9 |
| Dry Tensile, lb./in | 0.4 | 1.8 |
| Dry Tensile/Loading | 0.04 | 0.3 |
| Wet Tensile, lb./in | 0.2 | 0.3 |
| Wet Tensile/Loading | 0.02 | 0.04 |
| Wet/Dry Tensile | 0.5 | 0.2 |
| Dry Toughness, in.-lb./2 in.$^2$ | 0 | 0 |
| Wet Toughness, in.-lb./2 in.$^2$ | 0 | 0 |
| Dry Elongation, percent | 2.6 | 0.5 |
| Wet Elongation, percent | 7.0 | 1.9 |

From these data it is concluded that polymers having moduli appreciably less than $10^6$ dynes/cm.$^2$ are unsuitable for use in this invention.

EXAMPLE 8

This example shows the use of a polymer having a relatively high modulus. In both tests of this example, polystyrene having a tensile modulus of $3 \times 10^{10}$ dynes/cm.$^2$ was used. In comparative Test 1, the handsheets were prepared from directly air dried waterleafs, while in illustrative Test 2, the handsheets were prepared from waterleafs dried by solvent exchange. In both tests the handsheets were impregnated by immersion into a 3% solution of the polystyrene in benzene. This solution was subsequently coagulated by immersion into petroleum ether. After drying, all sheets were pressed at 175° C. for 2 minutes to 4 mils thickness. The results of this example are shown in Table VIII:

TABLE VIII

| | Test 1: Directly Dried | Test 2: Solvent Exchanged |
|---|---|---|
| Polymer Loading, percent | 5.5 | 5.2 |
| Dry Tensile, lb./in | 15.8 | 19.1 |
| Dry Tensile/Loading | 2.9 | 3.7 |
| Wet Tensile, lb./in | 2.6 | 8.3 |
| Wet Tensile/Loading | 0.5 | 1.6 |
| Wet/Dry Tensile | 0.2 | 0.4 |
| Dry Toughness, in.-lb./2 in.$^2$ | 0.8 | 1.4 |
| Dry Toughness/Loading | 0.15 | 0.27 |
| Wet Toughness, in.-lb./2 in.$^2$ | 0.2 | 0.8 |
| Wet Toughness/Loading | 0.03 | 0.15 |
| Wet/Dry Toughness | 0.21 | 0.57 |
| Dry Elongation, percent | 3.4 | 5.0 |
| Wet Elongation, percent | 4.4 | 8.6 |

Again, the marked superiority of sheet materials prepared in accordance with this invention is obvious from these results.

EXAMPLE 9

This example shows the use of another class of particularly preferred polymers. In the three illustrative tests, a chloroprene polymer (known as neoprene AC-Med) having a modulus of $7 \times 10^8$ dynes/cm.$^2$ was used. In Test 1, sheets were prepared from an unbeaten alpha pulp. In Tests 2 and 3, the sheets were prepared from bleached kraft pulp having a Canadian Freeness of 620. In Tests 1 and 2, the handsheets were impregnated by immersion into a 2% solution of the polymer in benzene. In Test 3, the polymer concentration in benzene was 3%. In all tests the polymer was coagulated by immersing the impregnated handsheets in petroleum ether. The results of this example are shown in Table IX:

TABLE IX

| | Test 1 | Test 2 | Test 3 |
|---|---|---|---|
| Polymer Loading, percent | 5 | 8 | 20 |
| Dry Tensile, lb./in | 15.5 | 24 | 30 |
| Wet Tensile, lb./in | 15.2 | 18 | 24 |
| Wet/Dry Tensile | 0.98 | 0.75 | 0.80 |
| Dry Toughness, in.-lb./2 in.$^2$ | 1.6 | 1.8 | 2.2 |
| Wet Toughness, in.-lb./2 in.$^2$ | 2.8 | 2.4 | 2.6 |
| Wet/Dry Toughness | 1.7 | 1.3 | 1.2 |
| Dry Elongation, percent | 8.0 | 7.0 | 6.5 |
| Wet Elongation, percent | 17.4 | 11.0 | 11.0 |

It will be noted that in each test, there is a very high retention of physical properties when wet. For instance, in Test 1, 98% of the dry tensile strength is retained when the sheet is wet. In each test the sheet materials surprisingly had markedly greater toughness when wet than when dry.

EXAMPLE 10

This example shows the preparation of heavy stock material in accordance with this invention. In illustrative Test 1, solvent exchanged bleached kraft pulp of 100–110 lb. basis weight and 25 mils thick was impregnated with a 1.5% solution in acetone of acrylonitrile/n-butyl acrylate copolymer as used in Example 1. These sheets were rolled to remove excess solution. The polymer was coagulated by immersion in petroleum ether. After drying, the sheets were then pressed at 150° C. using 35,000 lb. force. In comparative Test 2, a commercial, presumably directly dried, 122 lb. basis weight kraft stock was evaluated for comparative purposes. In illustrative Test 3, solvent exchanged bleached kraft pulp of 50–55 lb. basis weight, 12.5 mils thick was impregnated with polymer solution and coagulated as shown in Test 1. Five sheets were then pressed together as done in Test 1 to provide a basis weight of 250–300 lb. In comparative Test 4, a commercial, presumably directly air dried, 250 lb. basis weight kraft milk carton stock was evaluated. The results of this example are summarized in Table X:

*Test 5.*—The sheets were impregnated with a 3% benzene solution of a chlorinated (35 weight percent chlorine) copolymer of 98.1 weight percent ethylene and 1.9% methacrylic acid.

*Test 6.*—The sheets were impregnated with a 3% benzene solution of a chlorinated (40 weight percent chlorine) copolymer of 92% ethylene and 8% vinyl acetate.

*Test 7.*—The sheets were impregnated with a 3% benzene solution of a terpolymer of 53 weight percent ethylene, 44% propylene and 3% 1,4-hexadiene, and coagulated with acetone.

*Test 8.*—The sheets were impregnated with a 1% solution of a terpolymer of 91.6 weight percent vinylidene chloride, 7.4% ethyl acrylate and 1.0% itaconic acid, followed by coagulation in methanol.

*Test 9.*—The sheets were impregnated with a 3% tetrahydrofuran solution of a copolymer of 90 weight percent vinyl chloride and 10% allyl glycidyl ether with 5% maleic acid being added to the solution.

*Test 10.*—The sheets were impregnated with a 3% tetrahydrofuran solution of polyvinyl chloride.

TABLE X

|  | Test 1: 100–110 lbs. Stock of this Invention | Test 2: Commercial 122 lbs. Stock | Test 3: 250–300 lbs. Stock of this Invention | Test 4: Commercial 250 lbs. Milk Carton Stock |
|---|---|---|---|---|
| Polymer Loading, percent | 7.2 |  | 5.9 |  |
| Dry Tensile, lb./in | 46.4 | 45.5 | 128 | 125 |
| Wet Tensile, lb./in | 24.8 | 1.6 | 59.3 | 12.7 |
| Wet/Dry Tensile | 0.5 | 0.04 | 0.46 | 0.1 |
| Dry Toughness, in.-lb./2 in.$^2$ | 4.5 | 1.0 | 14.8 | 4.3 |
| Wet Toughness, in.-lb./2 in.$^2$ | 2.8 | 0 | 8.6 | 0.5 |
| Wet/Dry Toughness | 0.6 | 0 | 0.6 | 0.1 |
| Dry Elongation, percent | 7.0 | 3.6 | 8.4 | 2.5 |
| Wet Elongation, percent | 10.7 | 4.0 | 12.6 | 3.1 |

The marked superiority of the product of this invention over these existing commercial materials is obvious from these results.

EXAMPLE 11

This example illustrates the use of several miscellaneous polymers, varying widely in chemical constituency. In each test of this example, sheets were prepared from beaten, bleached sulfite pulp having a Canadian Freeness of 500 ml., which were solvent exchanged and pressed as described above. In each test, the polymer had a tensile modulus within the range of $10^6$ to $10^{11}$ dynes/cm.$^2$. The sheets were impregnated as noted below. Unless otherwise stated, the impregnated sheets were coagulated by immersion into petroleum ether:

*Test 1.*—The sheets were impregnated with a 3% acetone solution of a copolymer of 95 weight percent methyl acrylate and 5% methacrylic acid.

*Test 2.*—The sheets were impregnated with a 3% benzene solution of a copolymer of 70.6 weight percent ethylene and 29.4% vinyl acetate, followed by coagulation in methanol.

*Test 3.*—The sheets were impregnated with a 1% benzene solution of solid branched polyethylene.

*Test 4.*—The sheets were impregnated with a 3% benzene solution of chlorinated linear polyethylene (52 weight percent chlorine).

*Test 11.*—The sheets were impregnated with a 3% benzene solution of polyurethane.

*Test 12.*—The sheets were impregnated with a 3% benzene solution of polyhydantoin.

*Test 13.*—The sheets were impregnated with a 3% tetrahydrofuran solution of a copolymer of 20 weight percent acrylonitrile and 80% vinylidene chloride.

*Test 14.*—The sheets were impregnated with a 3% methyl ethyl ketone solution of a copolymer of 56 weight percent acrylonitrile and 44% butyl vinyl ether.

*Test 15.*—The sheets were impregnated with a 3% solution of a copolymer of 55 weight percent acrylonitrile and 45% 2-ethyl hexyl acrylate in a mixture of 33 weight percent dimethyl formamide and 67% acetone.

*Test 16.*—The sheets were impregnated with a 3% solution of a copolymer of 55 weight percent acrylonitrile and 45% lauryl methacrylate in a mixture of 33 weight percent dimethyl formamide and 67% acetone.

*Test 17.*—The sheets were impregnated with a 3% tetrahydrofuran solution of a chlorinated ether.

*Test 18.*—The sheets were impregnated with a 4% benzene solution of cis-polyisoprene.

*Test 19.*—The sheets were impregnated with a 3% benzene solution of cis-polybutadiene.

The results of this example, all tests of which are illustrative, are summarized in Table XI.

From these data it is evident that polymers of any chemical constituency, having the requisite tensile modulus, may be used in the practice of this invention.

EXAMPLE 12

Handsheets having the indicated properties were prepared and simultaneously swelled, unbonded and impregnated with the indicated solution of a copolymer of 45 weight percent acrylonitrile and 55 weight percent n-butyl acrylate having a tensile modulus of $5 \times 10^9$ dynes/cm.$^2$. After rolling, the impregnated sheets were immersed in the indicated coagulation liquid which was a nonsolvent for the polymer, miscible with the polymer solvent, and substantially more nearly inert to the fibers than the swelling-saturated solvent, so as to effect simultaneous coagulation and solvent exchange, and thereafter dry-air dried. The resulting products were hot pressed to indicated thicknesses, conditioned, and tested with results set forth in Table XII. In the tensile tests half-inch width samples were used. The experiments illustrate a simple preparation procedure and indicate the superior performance of dimethyl sulfoxide in such procedure. In the table, these symbols are used:

CSF—Canadian Standard Freeness
NMP—N-methyl-2-pyrollidone
DMA—dimethyl acetamide
DMSO—dimethyl sulfoxide
IP—isopropyl alcohol

TABLE XII

|  | Test No. | | |
| --- | --- | --- | --- |
|  | 1 | 2 | 3 |
|  | Polymer Solvent | | |
|  | NMP | DMA | DMSO |
| Percent Polymer in Solvent | 1 | 2 | 1 |
| Saturation Time, minutes | 16 | 3 | 1 |
| Coagulation solvent | IP | IP | IP |
| Paper handsheet: |  |  |  |
| Pulp, C.S.F. | 650 | 650 | 650 |
| Basis wt., oz./yd.$^2$ | 1.93 | 2.36 | 2.23 |
| Dry tensile, lb./in | 5.9 | 3.7 | 7.9 |
| Dry elongation, percent | 1.8 | 1.5 | 2.4 |
| Dry toughness, in.-lb./in.$^2$ | 0.09 | 0.04 | 1.14 |
| Thickness, mils: |  |  |  |
| On impregnation | 9.0 | 14.9 | 9.9 |
| Impregnated and pressed | 4.2 | 4.8 | 3.9 |
| Polymer Loading, Percent | 6.0 | 5.9 | 6.2 |
| Tensile, lb./in.: |  |  |  |
| Dry | 10.5 | 22.3 | 22.8 |
| Wet | 4.1 | 7.3 | 14.0 |
| Wet/Dry Tensile | 0.39 | 0.33 | 0.61 |
| Elongation, percent: |  |  |  |
| Dry | 2.8 | 3.8 | 4.4 |
| Wet | 5.9 | 9.3 | 9.6 |
| Toughness, in.-lb./in.$^2$: |  |  |  |
| Dry | 0.22 | 0.61 | 0.70 |
| Wet | 0.16 | 0.47 | 0.78 |
| Wet/Dry Toughness | 0.73 | 0.77 | 1.11 |

EXAMPLE 13

The general procedure of Example 12 was repeated using dimethyl sulfoxide solutions of the indicated polymers, all of which had a tensile modulus in the range of $10^8$–$10^{10}$ dynes/cm.$^2$, and the indicated coagulation solvents, with results as set forth in Table XIII. The experiments illustrate that a variety of conditions can be used. In the table, these symbols are used:

ACN/EHA—acrylonitrile/2-ethylhexylacrylate copolymer
ACN/BA—acrylonitrile/n-butyl acrylate copolymer
ACN/BVE—acrylonitrile/n-butyl vinyl ether copolymer
ACN/IB/BA—acrylonitrile/isobutylene/n-butyl acrylate terpolymer
ACN/IB—acrylonitrile/isobutylene copolymer
C—chloroform
n-BOH—n-butanol
IP—isopropanol
MC—methyl chloroform
B—benzene
$CH_2Cl_2$—methylene chloride
DE—diethyl ether
DMSO—dimethyl sulfoxide

TABLE XI

| Test Number | Polymer | Polymer Loading, percent | Dry Tensile, lb./in. | Dry Tensile/Loading | Wet Tensile, lb./in. | Wet Tensile/Loading | Wet/Dry Tensile | Dry Toughness, in.-lb./2 in.$^2$ | Wet Toughness, in.-lb./2 in.$^2$ | Wet/Dry Toughness | Dry Elongation, percent | Wet Elongation, percent |
| --- | --- | --- | --- | --- | --- | --- | --- | --- | --- | --- | --- | --- |
| 1 | Methyl Acrylate/Methacrylic Acid | 6.0 | 16.3 | 2.7 | 6.0 | 1.0 | 0.4 | 1.2 | 0.6 | 0.5 | 5.7 | 10.7 |
| 2 | Ethylene/Vinyl Acetate | 5.1 | 10.0 | 2.0 | 4.4 | 0.9 | 0.4 | 0.8 | 0.5 | 0.6 | 5.5 | 9.3 |
| 3 | Polyethylene | 2.4 | 7.0 | 3.0 | 4.5 | 1.9 | 0.6 | 0.4 | 0.3 | 0.7 | 6.2 | 8.7 |
| 4 | Chlorinated Linear Polyethylene | 4.5 | 13.5 | 3.1 | 7.3 | 1.7 | 0.5 | 0.7 | 0.8 | 1.1 | 5.4 | 9.0 |
| 5 | Chlorinated Ethylene/Methacrylic Acid | 6.8 | 12.9 | 1.7 | 10.0 | 1.4 | 0.7 | 1.0 | 1.0 | 1.0 | 4.4 | 10.6 |
| 6 | Chlorinated Ethylene/Vinyl Acetate | 7.8 | 11.7 | 2.0 | 9.0 | 1.1 | 0.7 | 0.7 | 1.0 | 1.2 | 5.1 | 10.3 |
| 7 | Ethylene/Propylene/1,4-hexadiene | 6.0 | 10.2 | 2.2 | 8.6 | 1.4 | 0.7 | 1.0 | 1.0 | 1.2 | 4.5 | 10.4 |
| 8 | Vinylidene Chloride/Ethyl Acrylate/Itaconic Acid | 3.5 | 13.7 | 2.6 | 9.5 | 1.4 | 0.5 | 0.8 | 0.5 | 0.9 | 6.4 | 10.4 |
| 9 | Vinyl Chloride/Allyl Glycidyl Ether | 4.6 | 12.7 | 2.6 | 7.5 | 1.3 | 0.6 | 0.5 | 0.5 | 0.7 | 3.6 | 6.4 |
| 10 | Polyvinyl Chloride | 7.0 | 20.2 | 2.9 | 13.2 | 1.6 | 0.6 | 1.5 | 1.3 | 1.0 | 2.6 | 7.5 |
| 11 | Polyurethane | 6.9 | 2.9 | 0.4 | 2.1 | 0.3 | 0.7 | 0.2 | 0.2 | 1.0 | 3.9 | 4.6 |
| 12 | Polyhydantoin | 6.4 | 19.7 | 4.4 | 6.0 | 1.0 | 0.4 | 1.5 | 0.6 | 0.5 | 4.5 | 6.6 |
| 13 | Acrylonitrile/Vinylidene Chloride | 4.7 | 21.0 | 4.2 | 11.4 | 2.4 | 0.6 | 1.4 | 0.9 | 0.6 | 5.2 | 9.3 |
| 14 | Acrylonitrile/Butyl Vinyl Ether | 5.3 | 18.0 | 3.4 | 11.4 | 2.1 | 0.6 | 1.4 | 1.1 | 0.8 | 4.5 | 8.8 |
| 15 | Acrylonitrile/2-ethyl Hexyl Acrylate | 7.7 | 17.3 | 2.2 | 10.9 | 1.4 | 0.6 | 1.0 | 1.2 | 0.9 | 5.0 | 6.6 |
| 16 | Acrylonitrile/Lauryl Methacrylate | 4.5 | 13.9 | 3.1 | 7.8 | 1.7 | 0.6 | 0.7 | 0.6 | 0.8 | 4.5 | 8.9 |
| 17 | Chlorinated Ether | 7.5 | 13.4 | 3.7 | 7.7 | 2.1 | 0.4 | 0.8 | 0.6 | 0.9 | 5.0 | 7.5 |
| 18 | Cis-Polyisoprene | 3.5 | 8.4 | 0.9 | 3.9 | 0.4 | 0.4 | 0.4 | 0.5 | 0.6 | 3.4 | 6.0 |
| 19 | Cis-Polybutadiene | 4.0 | 7.2 | 1.6 | 4.6 | 1.0 | 0.6 | 0.4 | 0.4 | 1.0 | 4.1 | 7.5 |

TABLE XIII

| | Test No. | | | | | | | | | |
|---|---|---|---|---|---|---|---|---|---|---|
| | 1 | 2 | 3 | 4 | 5 | 6 | 7 | 8 | 9 | 10 |
| Polymer | ACN/EHA | ACN/EHA | ACN/EHA | ACN/BA | ACN/BA | ACN/BA | ACN/BA | ACN/BVE | ACN/IB/BA | ACN/IB |
| Wt. percent composition | 61.5/38.5 | 61.5/38.5 | 61.5/38.5 | 65/35 | 75/25 | 45/55 | 45/55 | 79/21 | 60/18/22 | 84/16 |
| Concentration | 1.5 | 1.5 | 1.5 | 1 | 1 | 1.5 | 1 | 1 | 1 | 2 |
| Swelling-saturation solvent | DMSO | DMSO | DMSO | DMSO | DMSO | DMSO | DMSO | DMSO | DMSO | DMSO |
| Time, minutes | 3 | 3 | 3 | 3 | 2 | 3 | 16 | 4 | 1 | 3 |
| Coagulation solvent | C | n-BOH | IP | MC | IP | B | IP | $CH_2Cl_2$ | DE | n-BOH |
| Paper handsheet: | | | | | | | | | | |
| Pulp, C.S.F | 650 | 650 | 650 | 650 | 650 | 650 | 550 | 650 | 650 | 650 |
| Basis wt., oz./yd.$^2$ | 2.41 | 2.41 | 2.42 | 2.39 | 2.11 | 2.44 | 2.02 | 2.38 | 2.39 | 2.39 |
| Dry tensile, lb./in | 8.5 | 11.2 | 10.1 | 9.7 | 7.0 | 4.6 | 30.6 | 4.3 | 3.5 | 10.1 |
| Dry Elongation, percent | 2.4 | 2.6 | 2.4 | 2.4 | 1.8 | 1.8 | 3.3 | 1.8 | 1.5 | 2.2 |
| Dry toughness, in. lb./in.$^2$ | 0.15 | 0.22 | 0.18 | 0.18 | 0.10 | 0.06 | 0.75 | 0.06 | 0.04 | 0.17 |
| Thickness, mils | | | | | | | | | | |
| On impregnation | 9.4 | 9.5 | 9.5 | 9.1 | 8.7 | 15.8 | 6.2 | 23.0 | 17.3 | 9.1 |
| Impregnated and pressed | 4.4 | 4.5 | 4.4 | 4.3 | 4.3 | 4.2 | 4.0 | 4.6 | 3.9 | 4.3 |
| Polymer loading, percent | 11.3 | 12.2 | 12.3 | 6.4 | 11.4 | 7.0 | 13.7 | 12.6 | 13.6 | 14.3 |
| Tensile, lb./in.: | | | | | | | | | | |
| Dry | 29.9 | 35.4 | 32.8 | 21.4 | 27.2 | 23.8 | 29.5 | 28.6 | 23.9 | 32.2 |
| Wet | 12.9 | 15.2 | 15.4 | 13.6 | 14.5 | 14.4 | 11.5 | 12.9 | 11.3 | 9.1 |
| Wet/Dry tensile | 0.43 | 0.43 | 0.47 | 0.64 | 0.53 | 0.61 | 0.39 | 0.45 | 0.47 | 0.28 |
| Elongation, percent: | | | | | | | | | | |
| Dry | 5.8 | 5.7 | 6.4 | 4.7 | 5.4 | 4.3 | 4.5 | 4.1 | 3.6 | 4.9 |
| Wet | 8.5 | 9.2 | 10.2 | 9.0 | 8.8 | 10.5 | 6.9 | 9.3 | 7.5 | 6.7 |
| Toughness, in. lb./in.$^2$: | | | | | | | | | | |
| Dry | 1.24 | 1.39 | 1.43 | 0.75 | 0.89 | 0.69 | 0.83 | 0.80 | 0.61 | 1.10 |
| Wet | 0.65 | 0.87 | 0.98 | 0.74 | 0.71 | 0.92 | 0.44 | 0.70 | 0.49 | 0.40 |
| Wet/Dry Toughness | 0.52 | 0.63 | 0.60 | 0.99 | 0.80 | 1.33 | 0.53 | 0.88 | 0.80 | 0.36 |

EXAMPLE 14

The general procedure of the two preceding examples was repeated using commercial, saturation-base, debondable, swellable paper substrates of the characteristics indicated in Table XIV-A, with results as shown in Table XIV-B. In each test the fiber-swelling-saturation solvent for the polymer was dimethyl sulfoxide; the polymer was 45/55 weight percent acrylonitrile/n-butyl acrylate of tensile modulus $5 \times 10^9$ dynes/cm.$^2$.

TABLE XIV-A

| | (A) | (B) | (C) |
|---|---|---|---|
| Basis Wt., oz./yd.$^2$ | 2.33 | 3.07 | 4.46 |
| Thickness, mils | 7.2 | 10.3 | 15.1 |
| Tensile, lb./in., dry | 15.7 | 20.9 | 24.6 |
| Elongation, percent, dry | 2.7 | 2.9 | 2.4 |
| Toughness, in. lb./in.$^2$, dry | 0.26 | 0.37 | 0.38 |

The product of Test 6 of Table XIV-B was further evaluated as follows:

| | Dry | Wet/Dry |
|---|---|---|
| Finch Edge Tear ([1]): | | |
| Initial resistance lbs./in | 10.4 | 2.30 |
| Maximum resistance lbs./in | 11.1 | 2.29 |
| Median resistance lbs./in | 7.3 | 3.42 |
| Work to total tear, in.-lb | 1.02 | 3.75 |
| Elmendorf Internal Tear,[2] lbs | 0.61 | 1.40 |
| Puncture Resistance [3] | 87.7 | 0.99 |
| Burst Strength, p.s.i. | 120.8 | 0.83 |
| Fold Endurance, double folds | 1,675 | 3.45 |
| Drape Stiffness [4], overhang, in | ca. 7 | |
| Opacity [5], percent | 97.7 | |
| Porosity [6], sec./100 cc. airflow/in.$^2$ | 45.67 | |

[1] As per TAPPI-T 470-m-54 except specimens cut to 1.0 x 7.5 in. Cross-head speed of tester 0.5 in./min.; chart speed 5 in./min.; values read directly from chart; work to tear defined as integrated area beneath entire curve.
[2] As per TAPPI-T 414-m-49.
[3] Via Elmendorf Impact Tester; values calculated for ¾ in. ball $$p.s.i. = \frac{0.0602 \times \text{dial reading}}{\text{specimen thickness, in.}}$$

[4] As per ASTM D-1388T.
[5] As per TAPPI-T 425-m-44.
[6] Through 1 in.$^2$ orifice at 4.89 in. $H_2O$ pressure, using closed-top Gurley Densometer.

TABLE XIV-B

| | Test No. | | | | | | | |
|---|---|---|---|---|---|---|---|---|
| | 1 | 2 | 3 | 4 | 5 | 6 | 7 | 8 |
| Percent polymer in solvent | 1 | 1 | 1 | 1 | 1 | 1 | 2 | 2 |
| Swelling-saturation time, minutes | 2 | 4 | 3 | 6 | 1 | 2 | 8 | 4 |
| Coagulation solvent | IP | IP | IP | IP | IP | IP | B | B |
| Paper | (A) | (A) | (B) | (B) | (C) | (C) | (C) | (C) |
| Thickness, mils | | | | | | | | |
| On impregnation | 7.2 | 7.1 | 10.3 | 10.3 | 15.2 | 15.1 | 14.9 | 14.9 |
| Impregnated and pressed | 4.4 | 4.5 | 5.3 | 5.3 | 7.4 | 7.5 | 7.6 | 8.3 |
| Weight percent loading | 8.18 | 9.46 | 9.14 | 9.51 | 6.55 | 8.11 | 7.32 | 6.98 |
| Dry tensile, lb./in | 27.79 | 30.06 | 41.88 | 42.75 | 52.75 | 58.60 | 39.76 | 27.59 |
| Dry tensile/loading | 3.39 | 3.18 | 4.58 | 4.50 | 8.05 | 7.23 | 5.43 | 3.95 |
| Wet tensile, lb./in | 8.39 | 11.33 | 19.35 | 24.18 | 25.40 | 35.15 | 20.88 | 17.83 |
| Wet tensile/loading | 1.03 | 1.20 | 2.12 | 2.54 | 3.88 | 4.33 | 2.85 | 2.55 |
| Wet/Dry tensile | 0.30 | 0.38 | 0.46 | 0.57 | 0.48 | 0.60 | 0.53 | 0.65 |
| Dry elongation, percent | 4.2 | 4.9 | 4.8 | 4.9 | 5.1 | 5.5 | 4.5 | 3.7 |
| Wet elongation, percent | 7.1 | 7.8 | 8.2 | 9.7 | 9.0 | 9.8 | 8.5 | 8.1 |
| Dry toughness, in.-lb./in.$^2$ | 0.72 | 0.91 | 1.28 | 1.30 | 1.70 | 1.97 | 0.17 | 0.75 |
| Wet toughness, in.-lb./in.$^2$ | 0.33 | 0.48 | 0.88 | 1.30 | 1.23 | 1.79 | 0.90 | 0.78 |
| Dry toughness/loading | 0.087 | 0.096 | 0.140 | 0.136 | 0.259 | 0.242 | 0.160 | 0.107 |
| Wet toughness/loading | 0.041 | 0.050 | 0.096 | 0.136 | 0.188 | 0.220 | 00.122 | 0.111 |
| Wet/Dry toughness | 0.46 | 0.53 | 0.68 | 1.00 | 0.73 | 0.91 | 0.77 | 1.04 |

The above test results are similar to test results obtained on similar products in which the substrate cellulose fibers were highly preswollen and solvent exchanged before contact with impregnating solution. Dilatometric and other measurements indicate cellulose fiber swelling of about 60 volume percent using methanol, about 90 volume percent using water, about 100–500 volume percent using dimethyl sulfoxide and 100–1000 volume percent using aqueous caustic as the swelling agent.

What is claimed is:

1. The process of producing a dried polymer-bonded cellulose structure comprising: (1) impregnating a web of substantially non-hydrogen bonded wood pulp fibers swollen at least 50 volume percent of their natural unswollen volume with 0.1 to 30 percent, based on the weight of said fibers, of polymer, having a tensile modulus of $10^6$ to $10^{11}$ dynes/cm.$^2$, dissolved in a solvent which is inert to said fibers, (2) bathing the impregnated web with a fluid coagulating agent, said agent being miscible with said solvent and inert to said fibers, to coagulate and substantially deposit said polymer continuously and uniformly throughout the interstitial voids between the fibers of said web in an isotropic microcellular configuration binding said fibers together, and (3) drying said web to remove said inert solvent and agent while maintaining the fibers substantially in their swollen form.

2. The process of claim 1 wherein said impregnated web is swollen 80 to 500 volume percent.

3. The process of claim 2 wherein said polymer tensile modulus is $10^8$ to $10^{10.5}$ dynes/cm.$^2$.

4. The process of claim 3 wherein said polymer is a chloroprene or acrylonitrile polymer.

5. The process of producing a dried polymer-bonded cellulose structure comprising: (1) impregnating a web of substantially non-hydrogen bonded wood pulp fibers swollen at least 50 volume percent of their natural unswollen volume with 0.1 to 30 percent, based on the weight of said fibers, of polymer, having a tensile modulus of $10^6$ to $10^{11}$ dynes/cm.$^2$, dissolved in a solvent which is a swelling agent for said fibers, (2) bathing the impregnated web with a fluid coagulating agent, said agent being miscible with said solvent and a swelling agent for said fibers, to coagulate and substantially deposit said polymer continuously and uniformly throughout the interstitial voids between the fibers of said web in an isotropic microcellular configuration binding said fibers together, (3) removing said fiber swelling solvent and agent from said web by solvent exchange with a solvent which is inert to said fibers and (4) drying said web to remove said inert solvent while maintaining the fibers substantially in their swollen form.

6. The process of claim 5 wherein said coagulating agent swells said fibers less than 10 volume percent whereby coagulation of the polymer and solvent exchange are effected simultaneously.

7. The process of claim 6 wherein said impregnated web is swollen 80 to 500 volume percent.

8. The process of claim 7 wherein said polymer tensile modulus is $10^8$ to $10^{10.5}$ dynes/cm.$^2$.

9. The process of claim 8 wherein said polymer is a chloroprene or an acrylonitrile polymer.

10. The process of claim 9 wherein the coagulating agent is a liquid hydrocarbon of 4 to 15 carbon atoms or an alkanol of 1 to 8 carbon atoms.

11. A dry polymer-bonded cellulose structure comprising a web of swollen wood pulp fibers bonded together with a polymer, said fibers being swollen at least 50 percent of their natural unswollen volume, said polymer having a tensile modulus of $10^6$ to $10^{11}$ dynes/cm.$^2$, the amount of said polymer being from 0.1 to 30 percent of the weight of said fibers, said polymer substantially distributed continuously and uniformly throughout the interstitial voids between the fibers of said structure in an isotropic microcellular configuration.

12. Structure of claim 11 wherein said fibers are swollen 80 to 500 percent of their natural unswollen volume.

13. Structure of claim 12 wherein said tensile modulus is $10^8$ to $10^{10.5}$ dynes/cm.$^2$.

14. Structure of claim 13 wherein the amount of said polymer is 1 to 10 percent of the weight of said fibers.

15. Structure of claim 14 wherein said polymer is a chloroprene or an acrylonitrile polymer.

16. The process of claim 5 wherein the web of wood pulp fibers is initially hydrogen bonded and unswollen whereby the polymer solution simultaneousy (1) swellls the web and makes the web substantially non-hydrogen bonded and (2) impregnates the web with the polymer solution.

17. The process of claim 16 wherein said coagulating agent swells said fibers less than 10 volume percent whereby coagulation of the polymer and solvent exchange are effected simultaneously.

References Cited

UNITED STATES PATENTS

| | | | |
|---|---|---|---|
| 1,606,595 | 11/1926 | O'Brien | 162—102 |
| 1,891,027 | 12/1932 | Richter | 162—135 X |

S. LEON BASHORE, Primary Examiner

U.S. Cl. X.R.

117—140, 155; 161—170; 162—102, 164, 184